3,485,538
JOURNAL MOUNTING FOR ROTATABLE SHAFT
Thomas D. Nogle, Madison Heights, and Richard H. Smith, Birmingham, Mich., assignors to Chrysler Corporation, Highland Park, Mich., a corporation of Delaware
Filed July 12, 1968, Ser. No. 744,510
Int. Cl. F16c 7/04, 17/16
U.S. Cl. 308—9             10 Claims

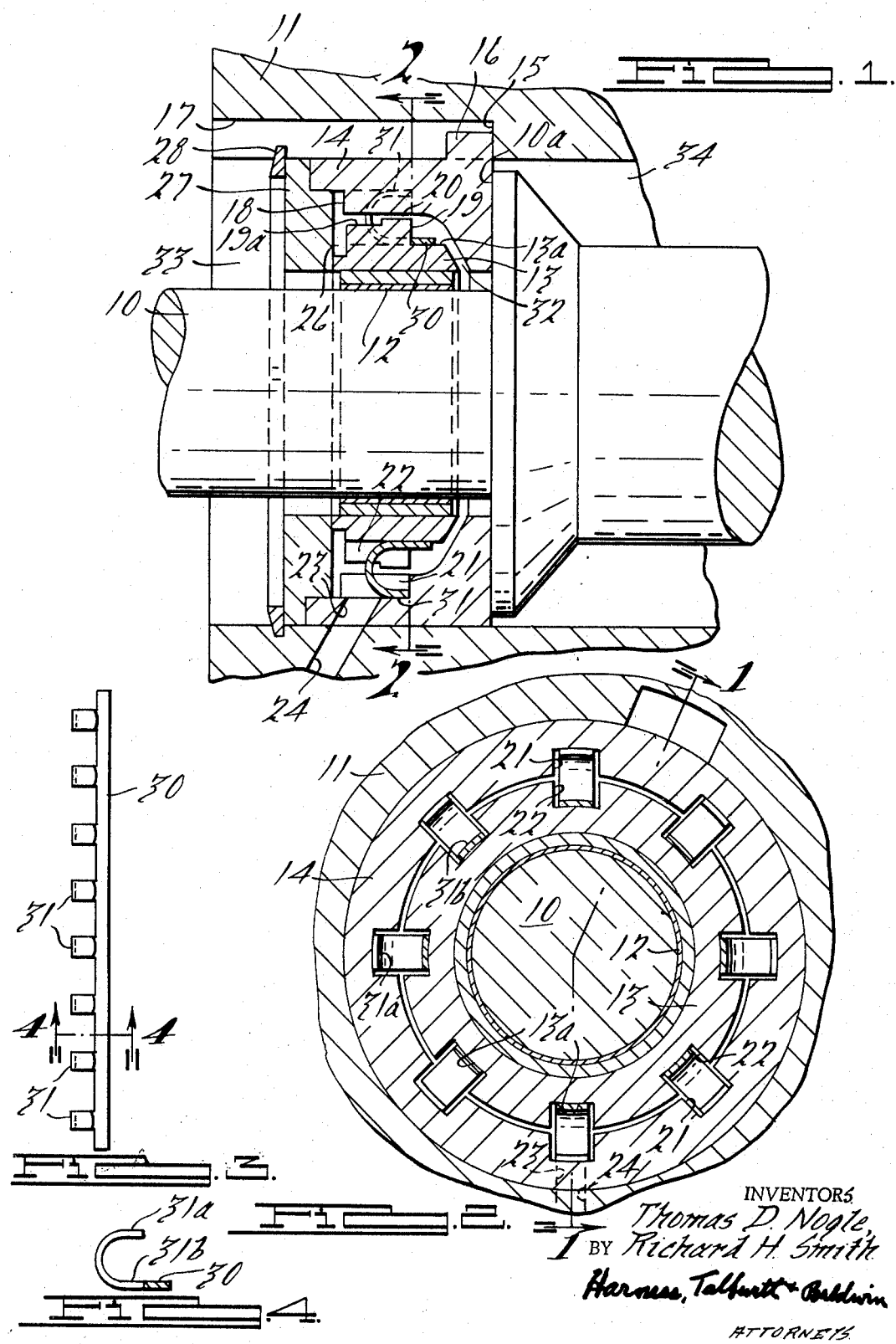

ABSTRACT OF THE DISCLOSURE

A self-aligning bearing support for the journal of a high speed rotatable shaft is resiliently supported by annular steel spring means having a comparatively low spring rate radially and portions spaced circumferentially for the unrestricted passage of lubricating fluid therebetween. The spring is compressed radially between the bearing support and an outer housing, which are closely spaced radially at a plurality of circumferentially spaced locations to effect an annularly arranged movement limiting clearance in communication with and interrupted by a plurality of circumferentially spaced regions of large radial clearance which also communicate with the spacing between the springs and with a drain to render oil film squeeze damping nominal at the movement limiting clearance. The housing and bearing are interlocked against relative axial and rotational movement by the circumferentially spaced portions of the spring means.

BACKGROUND OF THE INVENTION

This invention relates to a mounting suitable for a high speed rotatable shaft, as for example the compressor shaft for an automobile gas turbine engine subject to high temperature operating conditions and ordinarily susceptible to the transmission of alternating radial forces to and from the shaft resulting from shaft imbalance during rotation or road shock.

It has been common heretofore to provide resiliently mounted bearings for such shafts, employing rubber-like O-rings or in some cases metal springs. The O-rings are economical and permit easy bushing replacement but are otherwise objectionable because very low spring rates cannot be obtained and the rubber-like material has high internal damping. Both factors contribute to the undesirable transmission of radial forces to and from the shaft and result in undue wearing of the rotor assembly and the transmission of rotor frequency noise. Furthermore, the O-ring material cannot withstand high temperatures and its imperviousness frequently causes an annulus of oil to be trapped between adjacent O-rings, or an O-ring and a seal, with consequent oil film squeeze damping which contributes to the transmission of radial forces.

The metal springs employed heretofore have had low internal damping and have enabled wide temperature and spring rate ranges, but have resulted in oil film damping in consequence of lubricating oil being trapped between the inner and outer bearing cages, and frictional damping resulting from movement of the seal rings in their grooves. Also such bearing mountings have been subject to the assembly problem of maintaining concentricity of the journal and are frequently difficult to remove and replace.

SUMMARY OF THE INVENTION

An object of the present invention has been to avoid the above difficultise and specifically to provide an improved resilient shaft mounting as aforesaid suitable for high speed and high temperature applications and characterized by minimum radial spring rate and damping consistent with support requirements, which thereby effects a resonance frequency far below the normal operating speed, yet which limits maximum shaft deflection during occasional unusually high radial loading.

Another object is to provide such a mounting comprising a bearing support which is independent of any thrust face on the shaft and which in consequence is self-aligning with the shaft or other journal means for the shaft, so as to minimize the transmission of radial forces and rotor frequency noise resulting from eccentricity or misalignment.

Other objects are to provide an improved, resiliently yieldable, self-aligning bearing support which can be readily assembled and replaced and which comprises annular steel spring means having circumferential spacing for the free passage of lubricating oil to minimize damping, and to provide such a spring which yieldingly maintains the bearing support in coaxial alignment with the shaft and allows limited cocking or radial adjustability of the bearing support to effect said alignment.

Another and more specific object is to provide such a bearing support and housing therefor wherein the annular spring means comprises a steel band extending circumferentially around the support and having a plurality of circumferentially spaced loop portions of low radial spring rate under compression between the housing and support to hold the latter yieldingly in predetermined centered position, the spring loops being confined within confronting notches in the housing and support and spaced by confronting radial projections of the housing and support, the projections being closely spaced radially to provide a small annularly arranged movement limiting radial clearance between the housing and support to limit the latter's maximum radial deflection in consequence of large momentary radial forces.

Another specific object is to provide such a support wherein the notches open axially in opposite directions and communicate with the small radial movement limiting clearance between said projections to reduce oil film damping therebetween, wherein sealing means fixed axially with respect to the housing sealingly engages the housing and support at one axial end to prevent oil flow in one axial direction from said notches, and wherein said notches communicate in the other axial direction with the lubricating duct system for the shaft and its bearing.

Another object is to provide such a mounting wherein the annular spring means maintains the bearing support in axial and circumferential position with respect to the shaft without interfering with the aforesaid self-aligning character of the bearing support and yieldingly urges said support in said one direction into said sealing engagement with said sealing means.

Other objects of this invention will appear in the following description and appended claims, reference being had to the accompanying drawings forming a part of this specification wherein like reference characters designate corresponding parts in the several views.

FIGURE 1 is a longitudinal sectional view through a rotatable shaft mounted in accordance with the present invention, taken substantially along line 1–1 of FIG. 2.

FIGURE 2 is a transverse sectional view taken in the direction of the arrows substantially along the line 2—2 of FIGURE 1.

FIGURE 3 is a reduced plan view of the spring illustrated in FIGS. 2 and 3, showing the band in a straightened condition.

FIGURE 4 is a fragmentary sectional view taken in the direction of the arrows substantially along the line 4—4 of FIGURE 3.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

DESCRIPTION OF THE PREFERRED EMBODIMENT

Referring to the drawings, a shaft 10 which may comprise the high speed rotatable shaft of an automobile gas turbine compressor, is journalled within a housing 11 by bearing means including an annular non-rotatable, two-part bushing 12 pressed snugly into an annular support 13. The latter is maintained coaxially within an annular non-rotatable sleeve 14 of housing 11, the sleeve 14 being confined within housing 11 against a shoulder 15 thereof and retained against rotation by means of an integral tab or key 16 closely retained within a keyway 17 extending axially within housing 11.

A plurality of circumferentially spaced projections 18 integral with the sleeve 14 extend radially inwardly toward similar confronting projections 19 integral with an extending radially outwardly from the support 13. The projections 18 and 19 are spaced radially approximately .004 to .005 inch or less to effect an annularly arranged movement limiting clearance 20. Between the projections 18 and 19 circumferentially, the support 13 and sleeve 14 are recessed at 21 and 22 respectively to provide large radial notches or clearances, FIG. 2.

Lubricating oil is supplied under pressure to the notches 21 and 22 by means of aligned lubrication ducts 23 and 24 in sleeve 14 and housing 11 respectively. The notches 21 and 22 open axially in one direction into a comparatively large annular cavity 26 bounded circumferentially by the confronting peripheries of support 13 and sleeve 14 and closed at its left axial end by an annular sealing disc 27 retained against leftward axial movement by a resilient tapered C-ring 28 partially embedded within an annular channel in housing 11. The sealing disc 27 abuts mating sealing surfaces at the left ends of support 13 and sleeve 14 to prevent axial flow of lubricating fluid leftward from cavity 26. The wedge action of the resilient tapered C-ring 28 urges sleeve 14 rightward positively against shoulder 15.

The right ends of the projections 19 lie in a plane normal to the axis of support 13 and rise from an annular outer surface portion or seat 13a for a spring steel band 30. The latter is formed from flat stock and curved to closely encircle the seat 13a with its ends terminating adjacent each other, but not overlapping, and its left edge closely abutting the right ends of the projections 19, FIG. 1. Between the projections 18 and 19 and extending integrally from the band 30 are a plurality of spring loops, FIGS. 3 and 4, having outer and inner parallel arm portions 31a and 31b confined within the notches 21 and 22 respectively and resiliently seated under radial compression against the bases of these notches so as to maintain the support 13 resiliently in concentric alignment with respect to sleeve 14 and to allow limited radial movement or cocking of support 13 to the limit permitted by the slight clearance 20. Also relative to the large force impulses which are ordinarily transmitted by a shaft 10 employed as aforesaid, the spring loops 31 have comparatively low spring rates radially amounting to about 3,000 pounds per inch. Although the radial force impulses transmitted from the length speed rotating shaft 10 might be very large, the duration of each impulse during ordinary operation is very small and the amplitude of the associated radial movement of shaft 10 resulting from rotational imbalance is substantially less than the clearance 20 and ordinarily in the neighborhood of .001 inch.

The resulting radial force ordinarily transmitted by the spring loops 31 is thus only about 3 lbs. A radial movement amplitude of .003 inch would be exceptional.

The loops 31 are spaced circumferentially from the sides of the notches 21 and 22, as indicated in FIGURE 2, to permit the free flow of lubricating fluid axially through these notches to the right side of the mounting in FIGURE 1 which opens to shaft 10 via annular passage 32 between support 13 and sleeve 14. Lubricating fluid feeds axially leftward from passage 32 via the bearing clearance between shaft 10 and the inner bearing surface of bushing 12 to an annular drain cavity 33 which communicates with a fluid return line. Similarly lubricating fluid feeds radially outwardly from passage 32 via the bearing clearance between the right end of sleeve 14 and thrust face 10a of shaft 10 to annular drain cavity 34 which also communicates with a fluid return line.

The spring loops 31 are sufficiently closely spaced circumferentially to balance out minor deviations in their dimensions and to maintain the support 13 and sleeve 14 yieldingly in the desired coaxial alignment prior to assembly with shaft 10. The free end of each loop arm 31a abuts under resilient tension the radial wall defining the right end of the associated notch 21, whereby the axial spring reaction of the several loops 31 urges support 13 leftward into its sealing engagement with seal 27 and maintains the axial clearance between support 13 and sleeve 14 which comprises passage 32. Thus the spring loops 31 yieldingly maintain the support 13 in predetermined axial position, as well as in concentric alignment, and by virtue of the interengagement within the notches 21 and 22, hold the support 13 against rotation.

The oversize notches 21 and 22 not only provide unrestricted communication between the cavity 26 and passage 32, but also minimize the confronting surface area of each pair of projections 18 and 19, thereby to minimize oil film squeeze damping at the clearance 20. This latter area is further reduced axially by an offset 19a, which effects an enlarged radial clearance connecting clearance 20 and cavity 26, and is as small as feasible consistent with the support requirements, so that in the event of occasional large radial forces directed to or from the shaft 10 as a result of momentary imbalances or road shocks, the maximum movement of the bearing support will be limited without overloading and damaging the contact area between the projections 18 and 19. On the other hand, the recesses 21, 22 and 19a in communication with the clearance 20 render damping in consequence of oil film squeeze nominal and unobjectionable. The spring loops 31 rather than oil damping are the primary means for transmitting radial forces. The radial spring rate of the steel springs 31 may be suitably predetermined in accordance with the support requirements without significant adverse effects from high temperature operating conditions, whereby resonance is avoided and the transmission of rotor noise and radial forces resulting from motor imbalance is minimized.

We claim:
1. In the combination of means adapted for operation under high temperature conditions for reducing under high temperature conditions for reducing the transmission of radial forces from a rotatable shaft during high speed rotation,
(A) bearing means having
(1) a bearing portion for journaling said shaft and
(2) annularly arranged supporting means for said bearing portion,
(B) an outer annular bearing housing around said supporting means,
(C) said housing and supporting means having cooperating portions closely spaced radially to effect a predetermined small annularly arranged movement limiting radial clearance therebetween to limit the maximum radial deflection of said supporting means with respect to said housing in consequence of un- usual large radial forces transmitted to said bearing means from said shaft, (D) spring means having a comparatively small spring rate radially and arranged annularly under compression between said housing and supporting means to urge the latter yieldingly to a predetermined centered position with respect to said housing,
  (1) said spring means comprising a circumferentially extending band and
  (2) a plurality of circumferentially spaced loops secured to said band and having portions resiliently seated against said supporting means and housing respectively, (E) radially extending abutment means on said supporting means and housing having portions interposed circumferentially between said circumferentially spaced loops to limit relative rotation of said supporting means with respect to said housing,
  (1) said band abutting axially the abutment means on one of the elements comprising said supporting means and housing and
  (2) said loops yieldingly abutting the abutment means on the other of said elements in axial opposition to the abutment means on said one element for yieldingly urging said supporting means in one axial direction with respect to said housing.

2. In the combination according to claim 1, said portions of said abutment means interposed circumferentially between said circumferentially spaced loops also comprising said cooperating portions closely spaced radially.

3. In the combination according to claim 1, one end of each of the loop portions seated against one of said elements being secured to said band and the other end of that loop portion being secured to one end of the other loop portion of that loop seated against the other of said elements, the other end of said other loop portion comprising the portion of the loop yieldingly abutting the abutment means on said other of said elements in axial opposition to the abutment means on said one element.

4. In the combination according to claim 3, said portions of said abutment means interposed circumferentially between said circumferentially spaced loops also comprising said cooperating portions closely spaced radially.

5. In the combustion according to claim 1, means fixed axially with respect to said housing and abutting said supporting means to limit movement thereof in said one axial direction.

6. In the combination according to claim 5, said means fixed axially comprising means in fluid sealing engagement with said housing and supporting means at one axial end of the latter to limit the flow of lubricating fluid in said one axial direction from between said housing and supporting means, the other axial end of said supporting means being spaced from said housing to enable the free passage of lubricating fluid therebetween and to enable freedom of relative movement of the yieldingly supported bearing means.

7. In the combination according to claim 1, said cooperating portions closely spaced radially comprising a plurality of portions spaced circumferentially by regions of said housing and supporting means having large radial spaces therebetween in unrestricted communication with said movement limiting radial clearance for reducing oil film damping thereat, and means for supplying lubricating fluid to said large radial spaces.

8. In the combination according to claim 7, said plurality of circumferentially spaced loops being within said large radial spaces respectively, each loop providing sufficient clearance within its radial space for the free flow of lubricating fluid within the latter space.

9. In the combination according to claim 8, each of said large radial spaces comprising a pair of confronting notches extending radially within said housing and supporting means respectively and associated with one of each of said plurality of loops, each loop having a pair of loop portions resiliently seated against the bases respectively of the associated pair of confronting notches, one of said loop portions being secured to said band, the other of said loop portions engaging said abutment means on said other element in axial opposition to the engagement between said band and the abutment means on said one element for yieldingly urging said supporting means axially in said one direction.

10. In the combination according to claim 9, said bearing portion comprising a sleeve bushing carried by said supporting means, annular closure means fixed axially with respect to said housing for closing each of said large radial spaces at one axial end thereof, said closure and supporting means having annular sealing surfaces abutting axially for limiting axial movement of said bearing means in said one direction and located around the axis of said bearing means at locations radially outwardly of the inner bearing surface of said bushing to prevent the free flow of lubricating fluid from said large radial spaces at said one end to said inner bearing surface, and passage means connecting said large radial spaces at their other axial ends with said inner bearing surface.

References Cited

UNITED STATES PATENTS 3,410,616  11/1968  Dee _____ 308—9

MARTIN P. SCHWADRON, Primary Examiner

F. SUSKO, Assistant Examiner